(12) United States Patent
Keidar-Barner et al.

(10) Patent No.: US 8,683,441 B2
(45) Date of Patent: Mar. 25, 2014

(54) SOFTWARE EQUIVALENCE CHECKING

(75) Inventors: Sharon Keidar-Barner, Yokneam Ilit (IL); Karen Frida Yorav, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 13/026,313

(22) Filed: Feb. 14, 2011

(65) Prior Publication Data
US 2011/0138362 A1 Jun. 9, 2011

Related U.S. Application Data

(63) Continuation-in-part of application No. 11/329,535, filed on Jan. 11, 2006, now Pat. No. 8,209,667.

(51) Int. Cl.
*G06F 9/44* (2006.01)

(52) U.S. Cl.
USPC .......................................... 717/124

(58) Field of Classification Search
USPC .......................................... 717/126
See application file for complete search history.

(56) References Cited

U.S. PATENT DOCUMENTS

| | | | |
|---|---|---|---|
| 6,289,502 B1 | 9/2001 | Garland et al. | |
| 6,343,376 B1 * | 1/2002 | Saxe et al. ..................... | 717/154 |
| 6,408,430 B2 | 6/2002 | Gunter et al. | |
| 7,493,602 B2 | 2/2009 | Jeager et al. | |
| 7,640,536 B1 | 12/2009 | Whalen et al. | |
| 7,757,219 B2 | 7/2010 | Ball et al. | |
| 2005/0066234 A1 * | 3/2005 | Darringer et al. ............... | 714/38 |
| 2005/0166167 A1 * | 7/2005 | Ivancic et al. ..................... | 716/5 |
| 2007/0168988 A1 | 7/2007 | Eisner et al. | |
| 2007/0239993 A1 * | 10/2007 | Sokolsky et al. ............. | 713/188 |
| 2009/0007087 A1 | 1/2009 | Ito et al. | |
| 2010/0122240 A1 | 5/2010 | Matsuo et al. | |
| 2010/0153923 A1 | 6/2010 | Kawahito | |

OTHER PUBLICATIONS

Godefroid et al.; "DART: Directed Automated Random Testing"; Proceeding of the 2005 ACM SIGPLAN Conference on Programming Language Design and Implementation; 2005 pp. 213-223.*
Person et al.; "Differential Symbolic Execution"; SIGSOFT 2008/FSE-16; Nov. 9-15.*
Flanagan et al.; "Predicate Abstraction for Software Verification"; POPL '02; Jan. 16-18, 2002.*
Jens Krinke; "Identifying Similar Code with Program Dependence Graphs"; IEEE 2001.*
Max Schafer et al., "Type Inference for Datalog With Complex Type Hierarchies", POPL'10, Jan. 17-23, 2010, Madrid, Spain.
Anastasis A. Sofokleous et al., "Batch-Optimistic Test-Cases Generation Using Genetic Algorithms", 2007 IEEE.
Bernhard Scholz et al., "User-Input Dependence Analysis Via Graph Reachability", SMLI TR-2008-171 Mar. 2008. Sun Labs. URL: http://labs.oracle.com/techrep/2008/smli_tr-2008-171.pdf.

(Continued)

*Primary Examiner* — Wei Zhen
*Assistant Examiner* — Clint Thatcher
(74) *Attorney, Agent, or Firm* — Ziv Glazberg

(57) ABSTRACT

Two programs are checked for equivalence. Based on concrete states, a control path in each program is determined. A symbolic representation of the output is determined for each program and verified that for every input that would execute the programs on the determined control paths, the outputs are the same. Based on this operation, iterative processing may be performed to verify equivalence for all inputs of the program.

20 Claims, 4 Drawing Sheets

(56) References Cited

OTHER PUBLICATIONS

Tamarah Arons et al., "Formal Verification of Backward Compatibility of Microcode", CAV 2005, LNCS 3576, pp. 185-198, 2005.

Suzette Person et al., "Differential Symbolic Execution", SIGSOFT FSE 2008: 226-237.

Stephen F. Siegel et al., "Using model checking with symbolic execution to verify parallel numerical programs", . ISSTA 2006: 157-168.

George C. Necula, "Translation Validation for an Optimizing Compiler", Published in the Proceedings of the ACM SIGPLAN Conference on Programming Language Design and Implementation, Vancouver 2000, pp. 83{95.

Ofer Strichman and Benny Godlin, "Regression Verifcation—a practical way to verify programs", DAC 2009: 466-471.

Clarke et al., "A Tool for Checking ANSI-C Programs," Tenth International Conference on Tools and Algorithms for the Construction and Analysis of Systems (TACAS), Barcelona, Spain, Mar. 29-Apr. 2, 2004, pp. 168-176.

Rabinovitz and Grumberg, "Bounded Model Checking of Concurrent Programs," Proceedings of the Seventeenth International Conference on Computer Aided Verification (CAV), Edinburgh, Scotland, UK, Jul. 6-10, 2005, pp. 82-97.

S. Barner, Z. Glazberg and I. Rabinovitz, "Wolf—Bug Hunter for Concurrent Software using Formal Methods," Proceedings of the Seventeenth International Conference on Computer Aided Verification (CAV), Edinburgh, Scotland, UK, Jul. 6-10, 2005, pp. 151-157.

S. Barner and I. Rabinovitz, Efficient Symbolic Model Checking of Software using partial disjunctive partioning, CHARME, p. 35-50, 2003.

Holzmann in "The Model Checker Spin," IEEE Transactions on Software Engineering, (23:5), May 1997, pp. 1-17.

Khurshid et al., in "Generalized Symbolic Execution for Model Checking and Testing," Ninth International Conference on Tools and Algorithms for the Construction and Analysis of Systems (TACAS), Warsaw, Poland, Apr. 7-11, 2003.

J.M Cobleigh et al., "Flavers: a finite state verification technique for software systems", In vol. 41 of IBM Systems Journal, pp. 140-165, 2002.

Godefroid P. et al., "Dart: Directed Automated Random Testing" Proceeding of the 2005 ACM SIGPLAN Conference on Programming Language Design and Implementation, 2005 pp. 213-223.

Sen K. et al., "CUTE: A Concolic Unite Testing Engine for C", Proceeding of the 10th European Software Engineering Conference Held Jointly with 13th ACM SIGSOFT International Symposium on Foundation of software engineering, 2005, pp. 263-272.

\* cited by examiner

SOFTWARE EQUIVALENCE CHECKING

CROSS-REFERENCE TO RELATED APPLICATION

This application is a continuation-in-part of application Ser. No. 11/329,535, filed 11 Jan. 2006 entitled "SOFTWARE VERIFICATION USING HYBRID EXPLICIT AND SYMBOLIC MODEL CHECKING", which is hereby incorporated by reference.

TECHNICAL BACKGROUND

The present disclosure relates to software verification in general, and to verifying that two programs are equivalent, in particular.

BACKGROUND

Computerized devices are an important part of the modern life. They control almost every aspect of our life—from writing documents to controlling traffic lights. However, computerized devices are bug-prone, and thus require a verification phase in which the bugs should be discovered. The verification phase is considered one of the most difficult tasks in developing a computerized device. Many developers of computerized devices invest a significant portion of the development cycle to discover erroneous behaviors of the computerized device, also referred to as a target computerized system. The target computerized system may comprise hardware, software, firmware, a combination thereof and the like. In some cases, a target device is defined by a design, such as provided by a hardware descriptive language such as VHDL, SystemC, or the like.

During development of computer programs, such as software, firmware, code for embedded devices or the like, the program may be modified, such as to introduce additional functionality, fix a bug or an erroneous operation by the program. In some cases, the program may be modified for design purposes only, such as to comply with coding style, to perform code refactoring, or for similar purposes.

The original and modified versions of the program may be checked for equivalence. In some cases, such as in case of code styling, the programs should be completely equivalent (i.e., for every input provide the same output and intermediate values). In other cases, on most inputs the two programs should provide the same outputs. Identifying inputs for which different outputs are produced may be useful in determining whether bugs were introduced to the program when the program was modified.

BRIEF SUMMARY

One exemplary embodiment of the disclosed subject matter is a computer-implemented method for equivalence checking of a first program and a second program, wherein the first and second programs are operative to receive a set of inputs, the method comprising: iteratively checking each valid pair of control paths for equivalence, wherein a valid pair of control paths is a pair of control paths for which there exists a representative value that causes the first and second programs to follow the pair of control paths, wherein the representative value comprising concrete values to the set of inputs; wherein the iteratively checking comprises: determining a representative value; determining a first control path in the first program associated with the representative value in the first program; determining a second control path in the second program associated with the representative value in the second program; evaluating a symbolic comparison between output values determined in the first and the second control paths; and whereby equivalence between the first program and the second program with respect to an equivalence class associated with the representative value is checked.

Another exemplary embodiment of the disclosed subject matter is a computerized apparatus for equivalence checking of a first program and a second program, wherein the first and second programs are operative to receive a set of inputs, the computerized apparatus having a processor and a storage device; the computerized apparatus comprising: a pair determinator configured to determine a valid pair of control paths, wherein a valid pair of control paths is a pair of control paths for which there exists a representative value that causes the first and second programs to follow the pair of control paths, wherein the representative value comprising concrete values of the set of inputs; a pair equivalence checker configured to check equivalence of output with respect to a pair of control paths, the pair comprising a first control path in the first program and a second control path in the second program; wherein the pair equivalence checker is configured to evaluate a symbolic comparison between output values determined in the first and the second control paths.

Yet another exemplary embodiment of the disclosed subject matter is a computer program product for equivalence checking of a first program and a second program, wherein the first and second programs are operative to receive a set of inputs, the computer program product comprising: a computer readable medium; a set of one or more program instruction for iteratively checking each valid pair of control paths for equivalence, wherein a valid pair of control paths is a pair of control paths for which there exists a representative value that causes the first and second programs to follow the pair of control paths, wherein the representative value comprising concrete values to the set of inputs; wherein the iteratively checking comprises: determining a representative value; determining a first control path in the first program associated with the representative value in the first program; determining a second control path in the second program associated with the representative value in the second program; and evaluating a symbolic comparison between output values determined in the first and the second control paths; and wherein the set of one or more program instructions are stored on the computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
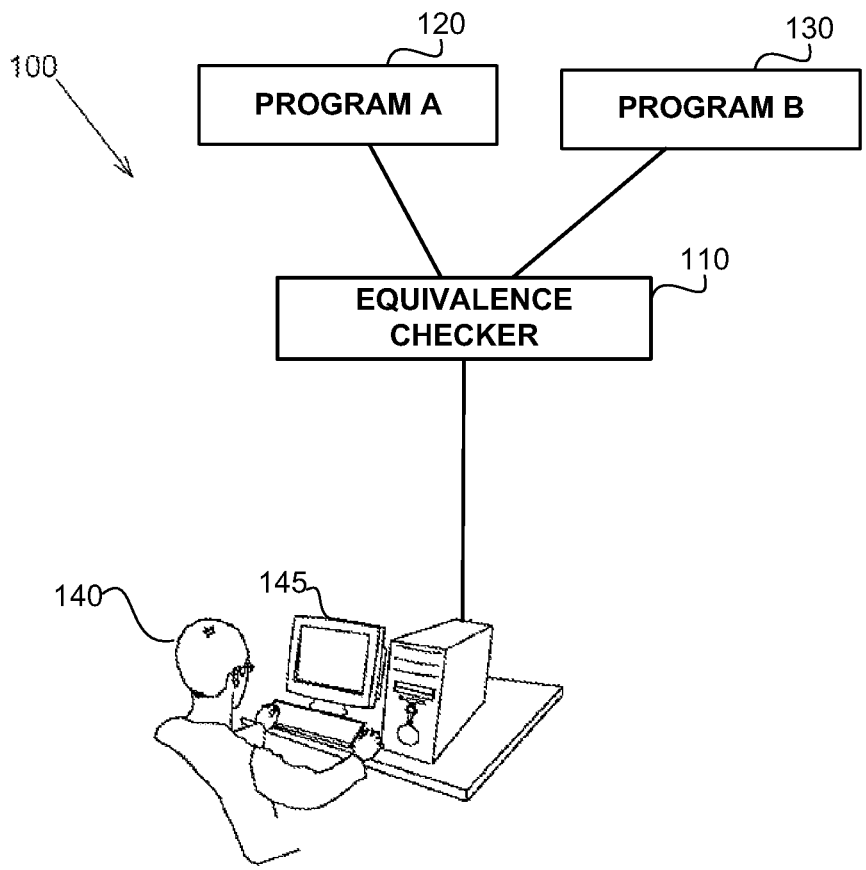
FIG. 1 shows a computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to check two programs for equivalence. Under the same inputs, the two programs should produce same output values. Another technical problem is the check equivalence for two non-isomorphic program.

One technical solution is to divide the checking process into pairs of control paths using a representative. The representative is a concrete state comprising specific input values. Based on the representative a control path of each program may be determined and examined. Using symbolic methods, outputs of the two programs with respect to the determined control paths may be represented and compared. Another technical solution is to iteratively generate a representative until all possible pairs of control paths are traversed and checked. Yet another technical solution is to transform the programs based on predetermined transformation rule so as to achieve a desired result, such reduce the number of pairs of control paths are checked, reduce the number of control paths or the like. Such desired result may increase efficiency of the disclosed subject matter. Yet another technical solution is to track path conditions of each control path and thereby symbolically represent the inputs for which the programs would follow the control path. The path conditions may be used to define a symbolic formula representative of outputs. The path conditions may be used to define a symbolic formula useful for determining a new representative. For example, a formula may hold that instead of hold the first path condition and the second path condition only one of the holds and the other does not hold, thereby any satisfying assignment to such a formula is a representative of a different pair of control paths. As another example, a formula representing a disjunction between conjunction of control paths of all pairs that were processed may be used and negated to provide for a new representative of a pair that was not yet processed. The symbolic formula may be a Boolean Satisfiability problem (SAT) and a SAT solver may be utilized to determine a satisfying assignment or prove unsatisfiability.

One technical effect of utilizing the disclosed subject matter is enabling checking of equivalence for two programs. The two programs may be the same program that underwent modifications such as bug fix, refactoring, efficiency improvements or the like. The two programs may be different programs having equivalent function such as two drivers for the same hardware device. Another technical effect is enabling a symbolic representation of large sets of states of the programs. The representative enables a relatively efficient division into equivalence classes, which are represented by two control paths. As only pairs of control paths that have a representative are processed, surplus processing of non-relevant pairs is avoided. By using symbolic representation, the disclosed subject matter is relatively scalable over an increase in data represented by the programs. Yet another technical effect is enabling an equivalence check that is not based on syntactic analysis alone. As not all syntactic differences create semantic differences between programs, verifying lack of syntactic difference may yield false positive or false negative results. Yet another technical effect is to check equivalence with respect to pairs of execution paths that can actually be executed for the same input. By checking only valid pairs, the amount of comparison that needs to be performed in order to verify equivalence is significantly reduced. This, as opposed to naïve static analysis methods.

Referring now to FIG. 1 showing a computerized environment in which the disclosed subject matter is used, in accordance with some exemplary embodiments of the subject matter. A computerized environment 100 may comprise an equivalence checker 110.

The equivalence checker 110 is configured to perform an equivalence check on two or more programs. For simplicity of the description, the equivalence check is disclosed between two programs 120 and 130, however it will be understood that in some exemplary embodiments, three or more programs may be compared. The programs may be provided by a user 140, such as a verification engineer, a developer, a QA staff member or the like. The two programs may be programmed in a programming language such as C++, C#, Java, Ada, Pascal, Prolog, Assembly, or the like. In some exemplary embodiments, the two programs may be programmed using different programming languages.

In some exemplary embodiments, the equivalence checker 110 may comprise hardware, software and/or firmware components, combination thereof or the like. The equivalence checker 110 may be operately coupled to other computerized modules useful for performing equivalence checking in accordance with the disclosed subject matter, such as a SAT solver, a Constraint Satisfaction Problem (CSP) solver, a Satisfiability Modulo Theories (SMT) problem solver, or the like.

In some exemplary embodiments, the user 140 may utilize a Man-Machine Interface (MMI) 145, such as a terminal, to review output from the equivalence checker 110 and/or to provide input to the equivalence checker 110.

Figure 2:
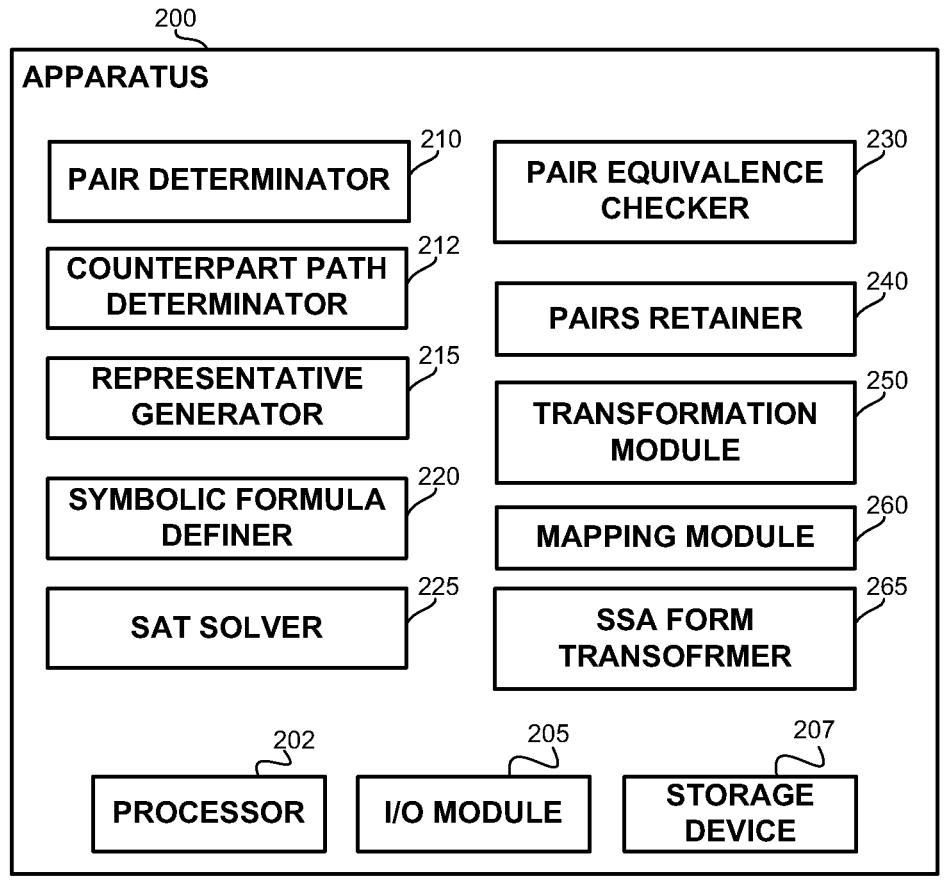
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter. An apparatus 200, such as 110 of FIG. 1, may be configured to obtain two or more programs and check them for equivalence.

In some exemplary embodiments, a pair determinator 210 may be operative to determine a valid pair of control paths to be processed. "Valid" pair of controls paths is a pair of controls paths in the two programs such that there exists at least one concrete set of input values that would cause the two programs to execute the corresponding control paths of the pair. The concrete set of input values is also referred to as a representative. In some exemplary embodiments, the representative may be a full explicit state based on the concrete set of input values.

In some exemplary embodiments, a representative generator 215 may be configured to generate a representative. The representative generator 215 may heuristically, randomly, or otherwise determine the set of inputs provided to the programs. In some exemplary embodiments, the representative generator 215 may execute or model check execution of the programs and in response to executing or modeling a step in which input is received generate concrete value as the input. In some exemplary embodiments, the representative generator 215 may generate additional representative by defining a symbolic formula using a symbolic formula definer 220 and determining a satisfying assignment of the formula, for example using a CSP solver, a SAT solver, a theorem prover, an SMT solver or the like.

In some exemplary embodiments, the representative generator 215 is configured to generate a representative that does not conform with any previously processed pair of control paths (i.e., the representative would result in an execution of a pair of control paths that were not yet processed together). The representative generator 215 may be operatively coupled to a pairs retainer 240 to ensure that a pair that was previously processed is not processed again. The representative generator 215 may configured to iteratively generate representatives until all possible pairs of the programs are processed and checked for equivalence. The representative generator 215 may utilize a symbolic formula definer 220 to determine a symbolic formula and utilize a solver, such as a SAT solver 225, to determine a representative.

In some exemplary embodiments, a symbolic formula definer 220 may be configured to define a symbolic formula representing all inputs under which a path is taken. In some exemplary embodiments, the formula may be a Boolean Satisfiability Problem (SAT), a Constraint Satisfaction Problem (CSP), a Satisfiability Modulo Theories (SMT) problem, or the like. The symbolic formula definer 220 may define the formula based on the path conditions of control paths. For example, a path in which the pertinent branches are followed based on predicates $p_1, p_2, \ldots, p_n$ may be represented by a symbolic formula stating $p_1 \wedge p_2 \wedge \ldots \wedge p_n$. For simplicity, such condition is referred to as path condition and is denoted as pc. As an example, in a path in which a first if is taken based on the premise that a>10 and a second if is not taken based on the premise that a>20 does not hold, the path condition may be $(a>10) \wedge \neg (a>20)$. In some exemplary embodiments, path conditions for the pair of conditions may be determined and utilized to define a formula for which the pair of paths is followed (e.g., $(pc_1 \wedge pc_2)$). In some exemplary embodiments, in order to determine a representative that does not follow a pair, a symbolic formula $\neg (pc_1 \wedge pc_2)$ may be defined. In case only one path is to be followed, the symbolic formula may be for example $(\neg pc_1 \wedge pc_2) \vee (pc_1 \neg pc_2)$. In some exemplary embodiments, in order to insure that previously processed pairs are not again processed, the formula may be conjuncted with $\neg (pair_1 \vee pair_2 \vee \ldots \vee pair_n)$, wherein pair is a condition based on the two control paths of the pair that must be held in order for the pair to be processed. The processed pairs may be obtained from a pairs retainer 240 which may retain the pairs themselves, the pertinent pair condition, or other data useful to avoid reprocessing a processed pair of control paths. For more information on control paths in accordance with the disclosed subject matter, refer also to in aforementioned U.S. patent application Ser. No. 11/329,535 (herein referred to as "ExpliSAT").

In some exemplary embodiments, in order to generate a representative, the representative generator 215 may try to determine a satisfying assignment to a formula defined by the symbolic formula definer 220. A satisfying solution may be determined by a solver, such as a SAT solver 215, a CSP solver (not shown), a theorem prover (not shown), an SMT solver (not shown), or the like. Other methods for determining a satisfying assignment, such as for example brute force enumeration, may be utilized.

In some exemplary embodiments, counterpart path determinator 212 may be configured to determine a pair of control paths based on another pair. The determined pair may comprise exactly one path of the original pair. For example, based on the pair (p1,p2), where p1 is a path in the first program and p2 is a path in the second program pairs such as (p3,p2) or (p1, p4) may be determined, where p3 is a path in the first program and p4 is a path in the second program. The determined pair is a valid pair. In some exemplary embodiments, the counterpart path determinator 212 may utilize the representative generator 215 to determine the pair. In some exemplary embodiments, the counterpart path determinator 212 may be operatively coupled to a pairs retainer 240 so as to avoid determined an already processed pair.

In some exemplary embodiments, a pair equivalence checker 230 may utilize the symbolic formula definer 220 to check the pair for equivalence. The symbolic formula definer 220 may define a formula that checks whether outputs yielded by the two paths are the same. The formula may be of the form: $(pc_1 \wedge pc_2) \wedge \neg ((out_1^1 = out_2^1) \wedge (out_1^2 = out_2^2) \wedge \ldots \wedge (out_1^m = out_2^m))$ where $out_j^i$ is the output value of the i-th output in the j-th path. The prefix of the formula ensures that a satisfying assignment of the formula would result in following the pair of control paths and the suffix checks whether on any of the outputs is not the same. The outputs may be compared based on a predetermined mapping, such as comparing the same named variables with each other, based on a mapping provided to the apparatus 200 and retained by a mapping module 260, or the like.

In some exemplary embodiments, a solver 225, such as a SAT solver, a CSP solver, a theorem prover, or the like may be utilized to solve the symbolic formula defined by the symbolic formula definer 220. The solution may be utilized to provide a counter-example showing different output for the same input. The solution may be utilized to provide a representative of a pair that was not yet processed. The solution may be utilized to prove that there is no additional counterpart path to be processed. The solution may be utilized to prove that there is no additional pair of control paths to be processed.

In some exemplary embodiments, a pairs retainer 240 may retain an indication of all pairs that were previously processed. For example, the pair of control paths may be retained explicitly. As another example, a pair of path conditions may be retained instead. Other indications of the pairs may be retained. The indications may be utilized, for example, to avoid processing the an already processed pair. In some exemplary embodiments, the path conditions of the pairs may be utilized to assure that the symbolic formula defined by the symbolic formula definer 220 is not solvable by any representative that would cause the programs to follow the processed pairs.

In some exemplary embodiments, a transformation module 250 may be operative to perform syntactic transformation on a program. The transformation may be in accordance with a predetermined transformation rule. The transformation rules may be designed to provide a syntactically different but semantically equivalent form. By applying the transformation rules, equivalence that may be proven using syntactical equivalence methods may be utilized.

In some exemplary embodiments, the transformation rule may be designed to yield a desired result. For example, the transformation may be designed to reduce a number of control paths in the program. Consider the following code: if (c1) then {if (c2) then {X}} which may be transformed to a syntactic equivalent code: if (c1 && c2) then {X}.

In some exemplary embodiments, the transformation rule may be operative to enforce a predetermined order between variables. For example, if (c2) then {if (c1) then {X}} may be transformed to if (c1 && c2) then {X}.

In some exemplary embodiments, in case a prefix of the two programs is identical, then the symbolic formulas may be simplified. In order to yield a larger identical prefix, the transformation may be performed. The transformation rules may be operative to transform the programs into a canonic form or a form that is most similar to a canonic form.

In some exemplary embodiments, a transformation rule may transform the predicate into a predetermined form. For example, the code if (!c) then {X} else {Y} may be transformed to if (c) then {Y} else {X}.

In some exemplary embodiments, the disclosed subject matter provides a more efficient solution when control paths of the programs are similar. For example, the more CFG vertexes are identical a method in accordance with the disclosed subject matter may be more efficient. The transformation rules may be designed to make the two programs similar. The transformation rules may be designed to reduce the number of pairs of control paths that are checked for equivalence.

In some exemplary embodiments, an SSA form transformer 265 may be operative to modify a control path of the program into an SSA form. The SSA form ensures that each variable is assigned exactly once. In order to maintain the feature of the SSA form when referring to variables from the two programs, different sets of variables may be used (e.g., variable i of program 1 may be referred to as i1_1, i1_2, i1_3 and so forth, while variable i of program 2 may be referred to as i2_1, i2_2 and so forth). In some exemplary embodiments, in case the control paths share an identical prefix, the duplicity may be omitted until the first occurrence in which the two control paths are different.

In some exemplary embodiments, the mapping module 260 may be utilized to provide an association between output variables of the two programs. In some exemplary embodiments, the mapping may be based on variable names (e.g., variable a of program 1 may be compared with variable a of program 2). In some exemplary embodiments, in case the name of a variable is modified, the mapping module 260 may provide a mapping between two output variables having a different name (e.g., variable a of program 1 and variable b of program 2).

In some exemplary embodiments, the mapping module 260 may indicate a subset of variables which are the output variables so as to avoid checking equivalence in intermediate variables (e.g., loop counters) or outputs which are known to have changed (e.g., bug fixes, added features).

The storage device 207 may be a Random Access Memory (RAM), a hard disk, a Flash drive, a memory chip, or the like. The storage device 207 may retain the programs design obtained by the apparatus 200 or intermediate representation thereof (e.g., SSA form, post-transformation by the transformation module 250, or the like), representative states, pairs retained by the pairs retainer 240, mapping utilized by mapping module 260, or the like.

In some exemplary embodiments of the disclosed subject matter, the verification tool 200 may comprise an Input/Output (I/O) module 205. The I/O module 205 may be utilized to provide an output to and receive input from a user, such as 140 of FIG. 1. The I/O module 205 may be utilized to obtain the programs, transformation rules, mapping utilized by the mapping module 260, or the like.

In some exemplary embodiments, the apparatus 200 may comprise a processor 202. The processor 202 may be a Central Processing Unit (CPU), a microprocessor, an electronic circuit, an Integrated Circuit (IC) or the like. The processor 202 may be utilized to perform computations required by the apparatus 200 or any of it subcomponents.

Figure 3:
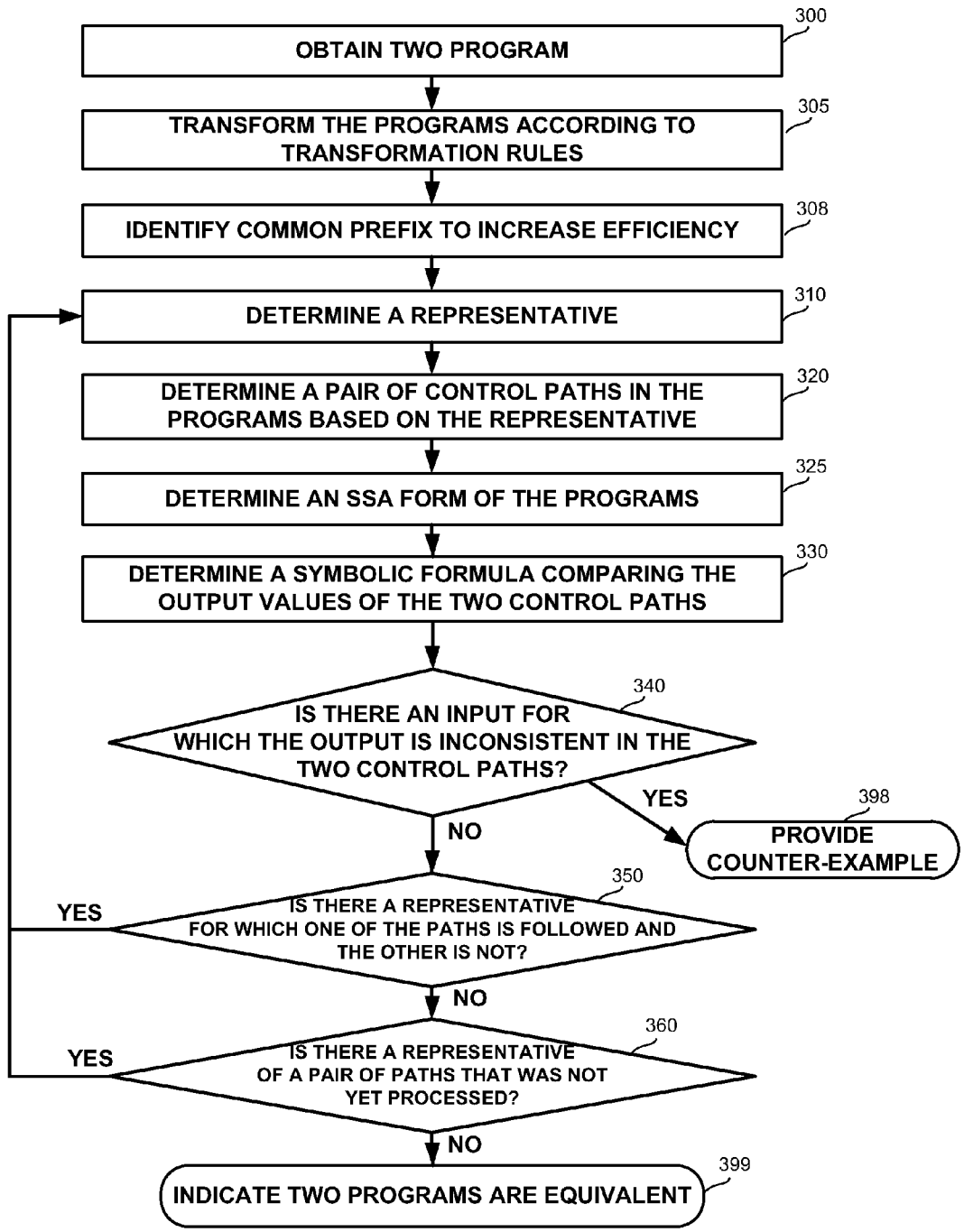
FIG. 3 shows a flowchart diagram of a method, in accordance with some exemplary embodiments of the disclosed subject matter.

Referring now to FIG. 3 showing a flowchart diagram of a method in accordance with some exemplary embodiments of the disclosed subject matter.

In step 300, two programs are obtained. The program may be obtained by an I/O module 205.

In step 305, the program may be transformed based on transformation rules. The transformation may be performed by a transformation module 250.

In step 308, a common prefix of both programs may be identified. The prefix may be utilized in reducing the size of the symbolic formulas, such as by unifying the formula with respect to prefix. For example, a symbolic formula may be, for example, prefix_pc∧ ($pc_1$)∧ ($pc_2$), where prefix_pc is a path condition of the prefix, $pc_i$ is a path condition of the suffix in program i. Consider the following two programs:

```
Program 1
x=input( );
if (x>10) {
        x=x%10;
}
x=x/2;
if (x>1) {x=1;} else {x=0;}
Program 2
x=input( );
if (x>10) {
        x=x%10;
}
x<<1;
if (x>1) {x=1;} else {x=0;}
```

Consider a representative of input=5. The SSA form of the control paths are as follows:

```
Program 1
x1=input( );
if (x1>10) {...}
x1__1=x1/2;
if (x1__1>1) { x1__2=1; }
Program 2
x1=input( );
if (x1>10) {...}
x2__1=x1<<1;
if (x2__1>1) {x2__2=1;}
```

As can be seen for the aforementioned example, for the duration of the prefix, the same variables are utilized for both programs, and therefore provide a less complicated symbolic formula. After the first difference in the program, each program is processed using different variable names.

In step 310, a representative may be determined. The representative may be determined based on an execution, a simulation, or the like. The representative may be determined based on a symbolic formula representing one or more possible pairs that should be processed. The existence of a representative holding path conditions may be determined by a representative generator 215. In some exemplary embodiments, a portion of the representative may be determined in advance and the rest of the representative may be determined dynamically during simulation of execution of the two programs, such as, for example, upon demand of an input not yet determined. Additional details on determination of the representative may be found in ExpliSAT.

In step 320, based on the representative, a pair of control paths in each program may be determined. The pair may be determined by a simulator (not shown) configured to simulate execution of the programs based on the input of the representative.

In step 325, the two control paths may be transformed into SSA form. The control paths may be transformed by a SSA form transformer 265.

In step 330, a symbolic formula comparing output values of the two control paths may be determined. The symbolic formula may be determined by a symbolic formula definer 220.

In step 340, based on the symbolic formula, a determination may be made whether there exists an input that would cause the two programs to follow the pair of control paths (i.e., inputs hold the path conditions) and for which the output of the programs is different. In case such an input exists, a counter-example refuting equivalence may be provided in step 398. The output values that are compared may be a subset of the output values of the programs, may be mapping by a predetermined mapping, or the like.

In step 350, in case there exists a representative that would cause a counterpart pair to be executed, step 310 may be performed with respect to that representative. The determination may be based on a symbolic formula defined by a symbolic formula definer 220 and solved by a solver, such as SAT solver 225.

In step 360, in case all counterpart pairs were processed, a determination whether other valid pairs exist. The pairs may be determined by determining a representative of the unprocessed pairs. The representative may be determined by a solver, such as a SAT solver 225, solving a symbolic formula defined by the symbolic formula definer 220.

In step 399, and in case no counter-examples were yet found, and in case all valid pairs were processed, a proof of equivalence is determined and an indication of equivalence is provided to a user, such as 140 of FIG. 1.

Figure 4:
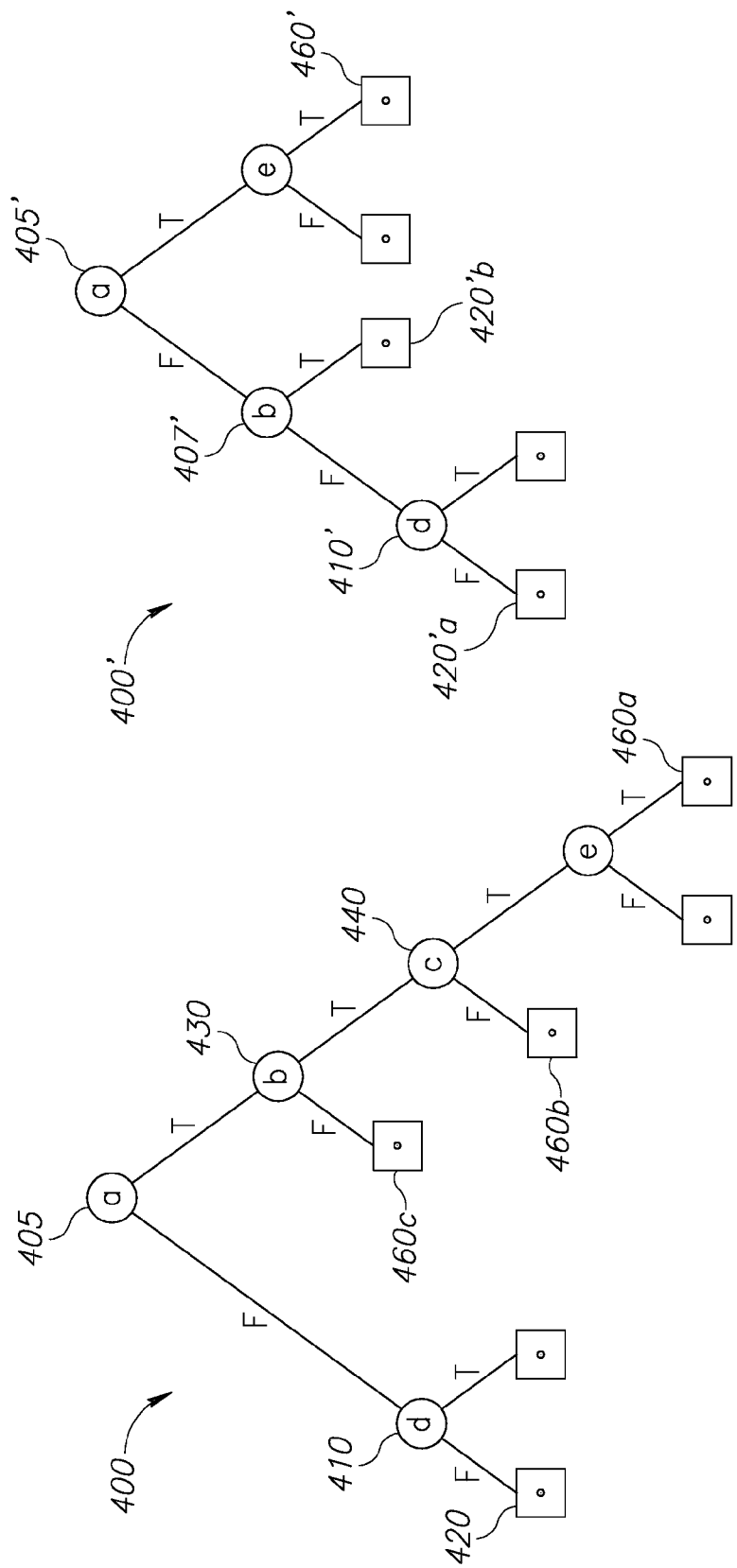
FIG. 4 shows a state diagram that schematically illustrates two control flow graph of two potentially equivalent programs.

Referring now to FIG. 4 showing a state diagram that schematically illustrates two control flow graph of two potentially equivalent programs.

A CFG 400 of program 1 is shown in comparison to CFG 400' of program 2. Nodes of the CFG represent branching instructions and the label in the node represent the predicate which needs to be held in order to continue to the right branch or be violated in order to continue to the left branch.

Consider a first representative which holds $\neg a \land \neg b \land \neg d$. In Program 1, the control path ends in a final step 420 (nodes 405, 410, 420) and in Program 2 the control paths ends in final step 420'a (node 405', 407', 410', 420'a). For simplicity we denote a path by its leaf. It will be noted that the CFGs of FIG. 4 are trees, however, the disclosed subject matter is not limited to CFGs of the form of trees and may be applied on CFGs that are represented by a generic form of graph. We denote the pair, for simplicity as (420, 420'a). From CFG 400, pc1 is $\neg a \land \neg d$ (from nodes 405 and 410), while the pc2 is $\neg a \land \neg b \land \neg d$ (from 405', 407', 410'). As can be appreciated, there is an input for which path 420 is followed in program 1 while path 420'a is not followed in program 2. Specifically, for a representative holding $\neg a \land b \land \neg d$ the pair (420, 420'b) is followed. Schematically, control path 420 is split into two control paths in program 2. Therefore, in order to verify that for each input that directs program 1 to follow path 420, two pairs should be processed. It will be noted that in some cases path conditions may be equivalent even though they are syntactically different.

Two distinct control paths in program 1 may be unified in program 2. For example, consider path 460' of program 2. For every representative that holds pc2 $a \land e$, any one of paths 460a, 460b, 460c of program 1 is followed. As can be noted, nodes 430 and 440 are omitted from CFG 400' and therefore the unification of the control paths.

In some exemplary embodiments, in order to traverse all valid pairs of paths, a pair is determined and processed. All of its counterpart pairs may be determined and processed. After all counterparts pairs are processed other paths may be determined, such as by determining control paths for example, consider the control path in which 405 takes the left branch and 410 takes the right branch. The path condition of such a path is $\neg a \land d$. As is explained with more detail in ExpliSAT, a satisfying assignment to this path condition may be useful to determine a representative following the desired path. It will be further noted, that this may be the case even if there are additional branching operations after node 410. The condition of the additional branches may be omitted and thereby letting the representative "lead" the execution into one control path out of possible control paths.

In some exemplary embodiments of the disclosed subject matter, two programs, P1 and P2 having a set of outputs out1 and out2 respectively are an input of a method in accordance with the disclosed subject matter.

Each program may have a "final" state in its CFG in which we will compare outputs. The final state may be indicated based on input from a user, an end of a function (e.g., main function), an exit statement, a return statement, exception being thrown, or the like.

In some exemplary embodiments, a preprocessing stage may be performed. P1 and P2 may be transformed to programs P1' and P2' respectively such that P1 semantically equivalent to P1' and P2 semantically equivalent to P2' and both P1' and P2' have a substantially canonic control flow. (for readability we will continue to refer to P1 and P2 in the rest of the algorithm although we apply our algorithm to the programs after transformation).

In some exemplary embodiments, P1 and P2 may be converted into Static Single Assignment (SSA) form. Different set of variables may be used for each program; so that each variable appears exactly one time in only one program. Output of each program is defined based on one or more variables that represent the result of each program.

3. Equivalence Checking Algorithm

In the following pseudo code variable "Covered" denotes a set of the covered pairs (e.g., the path conditions that represent the pair). Variable PathsToCover contains formula representing following exactly one of a pair of control paths.

Generally, the pseudo code traverses over the control flow path of both programs in parallel using the same heuristics that the ExpliSAT algorithm is using when checking functionality of one program. If we find two executions of the programs that share the same inputs values but give a different output we report that the two programs are not equivalent. Note that when a certain control flow path is identical between P1 and P2 PathsToCover will be empty. If a certain control flow path in P1 (path1) has more than one control flow path in P2, (path21, path22) that may share the same inputs values we check first the equivalence of the two paths represented by a first determined representative. Then PathsToCover may contain the combination that was not checked path1 and path22 and using a SAT solver on PathsToCover the pseudo code may find a representative that is in accordance with this combination. The pseudo code continues until there are no more combinations to check and then move to check other control paths using ExpliSAT heuristic.

| Pseudo Code: |
|---|
| rep = choose representative according to ExpliSAT heuristic<br>PathToCover = FALSE //empty set<br>Covered = FALSE //empty set<br>While rep != none //(none = no representative could be generated)<br>{<br>    determine pc1 and pc2 of the two programs according to the rep<br>    upon reaching final steps in both programs check<br>    $SAT(pc_1 \wedge pc_2 \wedge (out_1 \neq out_2)$<br>    If a satisfying assignment is found<br>        return it as a counter example (P1 and P2 are not<br>        equivalent)<br>    Covered = Covered$\wedge(pc_1 \wedge pc_2)$<br>    PathToCover = PathToCover$\vee((\neg pc_1 \wedge pc_2) \vee (pc_1 \wedge \neg pc_2))$<br>    PathToCover = PathToCover$\wedge \neg$Covered<br>    rep = SAT(PathToCover) //determine a representative of a<br>    counterpart pair<br>    if rep is none // No additional counterpart pairs to cover<br>    {<br>      rep = choose representative according to Explisat heuristic<br>      PathsToCover = FALSE //This does not modify the unsatisfiable<br>      PathsToCover.<br>                      But rather simplifies the symbolic<br>                      representation.<br>    }<br>}<br>Return P1 and P2 are equivalent |

In some exemplary embodiments, instead of checking all executions in PathsToCover before moving to checking other executions related to another control flow it is possible to use priority queue that contains all the executions left to cover and to do it heuristically.

Assuming both P1 and P2 are finite programs, once all valid pairs of control paths were iterated and verified to be equivalent, there is a proof that P1 and P2 are equivalent.

A representative chosen according to ExpliSAT heuristic is a determination of a set of all input values. When P1 and P2 look at the same input the value of this input, output in both programs is verified to be identical. In some exemplary embodiments, the representative is chosen by defining a symbolic formula of a pair of control path that were not yet traversed, as is disclosed in ExpliSAT.

It will be noted that the representative may be initially determined partially and completed in a dynamic manner in response to simulating execution of the two programs. For example, consider that the pair (420, 420'a) of FIG. 4 was processed. Assuming that the value of a is set based on an input, changing the input so as to cause a to be TRUE instead of FALSE may be sufficient to generate a representative of a valid pair that was not yet processed. During simulation of the two programs, additional inputs may be required to be received and determined dynamically such as based on a heuristic, on a biasing mechanism, on a random determination, or the like. In such a manner, not all input values are determined in advance. The determination of the representative in such an exemplary embodiment (e.g., step 310 of FIG. 3) is the determination of the values that was performed in advance and dynamically.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for equivalence checking of a first program and a second program, wherein the first and second programs are operative to receive a set of inputs, the method comprising:
   iteratively checking each valid pair of control paths for equivalence, wherein a valid pair of control paths is a pair of control paths for which there exists a representative value that causes the first and second programs to follow the pair of control paths, wherein the representative value comprising concrete values to the set of inputs; wherein said iteratively checking comprises:
      determining a representative value;
      determining a first control path in the first program associated with the representative value in the first program;
      determining a second control path in the second program associated with the representative value in the second program; and
      evaluating a symbolic comparison between output values determined in the first and the second control paths; and
   with respect to a valid pair comprising the first and second control paths, iteratively determining one or more additional valid pairs of control paths for which there exists a second representative value that is operable to cause one of the first or second program to follow the first or second control path respectfully and a counterpart control path to follow a different control path; wherein for each such second representative, evaluate a symbolic comparison between output values; wherein said iteratively determining control paths comprises:
      defining a symbolic formula, the symbolic formula comprising a disjunction between a first condition and a second condition, wherein the first condition is held for values for which the first control path is followed in the first program and the second control path is not followed in the second program, and wherein the second condition is held for values for which the first control path is not followed in the first program and the second control path is followed in the second program;
      determining a satisfying solution to the symbolic formula; and
      utilizing the satisfying solution to provide a representative value;
   whereby equivalence between the first program and the second program with respect to an equivalence class associated with the representative value is checked;
   whereby equivalence between the first and second programs is checked.

2. The computer-implemented method of claim 1, wherein the symbolic formula further comprising a third condition; wherein the third condition is defined to exclude any state that follows a pair of control paths that were previously checked together from being a solution to the symbolic formula.

3. The computer-implemented method of claim 1, further comprising performing syntactic transformation of the first and second program in accordance with a predetermined transformation rule.

4. The computer-implemented method of claim 3, wherein the transformation rule is operative to reduce a number of valid pairs of control paths in the first and second computer programs, wherein a valid pair of control paths is a pair of control paths for which there exists a representative value that causes the first and second programs to follow the pair of control paths.

5. The computer-implemented method of claim 3, wherein the transformation rule enforces a predetermined order between variables of a program.

6. The computer-implemented method of claim 1, wherein said evaluating comprises:
   determining a first path condition for the first control path;
   determining a second path condition for the second control path;
   defining a symbolic formula, wherein the symbolic formula comprises the first and second path conditions, wherein the symbolic formula further comprises a comparison between corresponding output values of the first and second program; and
   solving the symbolic formula.

7. The computer-implemented method of claim 6, wherein the symbolic formula is a Boolean formula, and wherein said solving utilizes a Boolean Satisfiability Problem (SAT) solver.

8. The computer-implemented method of claim 7, further comprising transforming the first and second programs into Static Single Assignment (SSA) form; and wherein said defining the symbolic formula comprises defining the symbolic formula with respect to the SSA form of the first and second computer programs.

9. The computer-implemented method of claim 1, further comprising:
obtaining a mapping between outputs of the first program and outputs of the second program; and
wherein said evaluating comprises performing a comparison between output values in accordance with the mapping.

10. The computer-implemented method of claim 1, wherein said determining the representative value comprises:
determining concrete values for at least a portion of set of inputs, wherein the determined concrete values are operative to cause the first and second programs to follow a valid pair of control paths that was not previously processed by the computer-implemented method.

11. An apparatus configured to perform equivalence checking of a first program and a second program, wherein the first and second programs are operative to receive a set of inputs, the apparatus comprising a processor coupled to a memory, wherein said processor is configured to perform:
iteratively checking each valid pair of control paths for equivalence, wherein a valid pair of control paths is a pair of control paths for which there exists a representative value that causes the first and second programs to follow the pair of control paths, wherein the representative value comprising concrete values to the set of inputs; wherein said iteratively checking comprises:
determining a representative value;
determining a first control path in the first program associated with the representative value in the first program;
determining a second control path in the second program associated with the representative value in the second program; and
evaluating a symbolic comparison between output values determined in the first and the second control paths; and
with respect to a valid pair comprising the first and second control paths, iteratively determining one or more additional valid pairs of control paths for which there exists a second representative value that is operable to cause one of the first or second program to follow the first or second control path respectfully and a counterpart control path to follow a different control path; wherein for each such second representative, evaluate a symbolic comparison between output values; wherein said iteratively determining control paths comprises:
defining a symbolic formula, the symbolic formula comprising a disjunction between a first condition and a second condition, wherein the first condition is held for values for which the first control path is followed in the first program and the second control path is not followed in the second program, and wherein the second condition is held for values for which the first control path is not followed in the first program and the second control path is followed in the second program;
determining a satisfying solution to the symbolic formula; and
utilizing the satisfying solution to provide a representative value;
whereby equivalence between the first program and the second program with respect to an equivalence class associated with the representative value is checked;
whereby equivalence between the first and second programs is checked.

12. The apparatus of claim 11, wherein the symbolic formula further comprising a third condition; wherein the third condition is defined to exclude any state that follows a pair of control paths that were previously checked together from being a solution to the symbolic formula.

13. The apparatus of claim 11, wherein said processor is further configured to perform syntactic transformation of the first and second program in accordance with a predetermined transformation rule.

14. The apparatus of claim 13, wherein the transformation rule is operative to reduce a number of valid pairs of control paths in the first and second computer programs, wherein a valid pair of control paths is a pair of control paths for which there exists a representative value that causes the first and second programs to follow the pair of control paths.

15. The apparatus of claim 14, wherein the transformation rule enforces a predetermined order between variables of a program.

16. The apparatus of claim 11, wherein said evaluating comprises:
determining a first path condition for the first control path;
determining a second path condition for the second control path;
defining a symbolic formula, wherein the symbolic formula comprises the first and second path conditions, wherein the symbolic formula further comprises a comparison between corresponding output values of the first and second program; and
solving the symbolic formula.

17. The apparatus of claim 16, wherein the symbolic formula is a Boolean formula, and wherein said solving utilizes a Boolean Satisfiability Problem (SAT) solver.

18. The apparatus of claim 17, further comprising transforming the first and second programs into Static Single Assignment (SSA) form; and wherein said defining the symbolic formula comprises defining the symbolic formula with respect to the SSA form of the first and second computer programs.

19. The apparatus of claim 11, wherein said processor is further configured to perform:
obtaining a mapping between outputs of the first program and outputs of the second program; and
wherein said evaluating comprises performing a comparison between output values in accordance with the mapping.

20. The apparatus of claim 11, wherein said determining the representative value comprises: determining concrete values for at least a portion of set of inputs, wherein the determined concrete values are operative to cause the first and second programs to follow a valid pair of control paths that was not previously processed by the computer-implemented method.

* * * * *